United States Patent
Sackmaier et al.

(10) Patent No.: US 12,023,711 B2
(45) Date of Patent: Jul. 2, 2024

(54) CONVEYING DEVICE AND METHOD FOR CONVEYING BULK MATERIAL

(71) Applicant: Uhlmann Pac-Systeme GmbH & Co. KG, Laupheim (DE)

(72) Inventors: Steffen Sackmaier, Dresden (DE); Sebastian Binder, Schwendi (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 0 days.

(21) Appl. No.: 17/864,308

(22) Filed: Jul. 13, 2022

(65) Prior Publication Data

US 2023/0036327 A1 Feb. 2, 2023

(30) Foreign Application Priority Data

Jul. 30, 2021 (EP) .................................... 21188862

(51) Int. Cl.
  *B07B 13/05* (2006.01)
  *B65G 43/08* (2006.01)
  *B65G 47/24* (2006.01)

(52) U.S. Cl.
  CPC .............. *B07B 13/05* (2013.01); *B65G 43/08* (2013.01); *B65G 47/24* (2013.01); *B65G 2201/04* (2013.01)

(58) Field of Classification Search
  CPC ........ B07B 13/05; B65G 47/24; B65G 43/08; B65G 2201/04
  See application file for complete search history.

(56) References Cited

U.S. PATENT DOCUMENTS

| | | | | | |
|---|---|---|---|---|---|
| 4,462,287 | A | * | 7/1984 | Weis | B26D 7/18 83/157 |
| 6,371,304 | B2 | * | 4/2002 | Gambini | B26D 1/18 209/621 |
| 6,607,082 | B2 | * | 8/2003 | Biagioni | B26D 7/18 198/460.2 |
| 6,820,750 | B2 | * | 11/2004 | Gambini | B26D 7/18 209/621 |
| 8,167,136 | B2 | * | 5/2012 | Betti | B26D 7/18 209/621 |

(Continued)

FOREIGN PATENT DOCUMENTS

| | | | | |
|---|---|---|---|---|
| AT | 323058 B | | 6/1975 | |
| CN | 111112086 A | * | 5/2020 | ............. B07B 13/14 |

(Continued)

OTHER PUBLICATIONS

European Search Report dated Jan. 13, 2022.
Korean Office Action from KR 10-2021-019408 dated Mar. 29, 2024.

*Primary Examiner* — James R Bidwell
(74) *Attorney, Agent, or Firm* — Dickinson Wright PLLC

(57) ABSTRACT

A conveying device for conveying bulk material, comprising products and product breakage thereof, in a conveying direction has a first conveying element and a second conveying element which is arranged downstream of the first conveying element, with the result that a gap is formed between the first and the second conveying element. A covering element is arranged above the gap. The gap has a first width according to a predefined separating criterion in such a way that the passage of product breakage through the gap is allowed and the passage of products through the gap is prevented.

16 Claims, 6 Drawing Sheets

(56) References Cited

U.S. PATENT DOCUMENTS

| | | | |
|---|---|---|---|
| 8,833,546 B2* | 9/2014 | Tsai | B65H 31/3009 |
| | | | 198/594 |
| 8,851,275 B2* | 10/2014 | Tsai | B65H 31/3009 |
| | | | 198/594 |
| 11,540,524 B2* | 1/2023 | Lanzky | A22C 17/0093 |
| 2011/0056797 A1 | 3/2011 | Tsai | |
| 2013/0175207 A1* | 7/2013 | Shuttleworth | B07B 13/04 |
| | | | 209/663 |
| 2014/0054130 A1 | 2/2014 | Grootherder | |

FOREIGN PATENT DOCUMENTS

| | | |
|---|---|---|
| JP | S52155768 A | 12/1977 |
| JP | 2014516332 A | 7/2014 |
| KR | 1020100108861 A | 10/2010 |
| KR | 1020180121195 A | 11/2018 |

\* cited by examiner

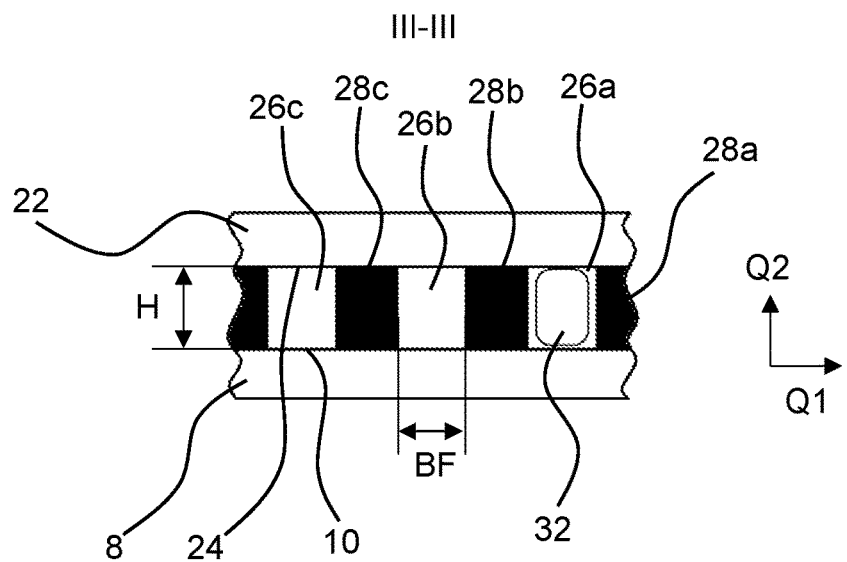
Fig. 3
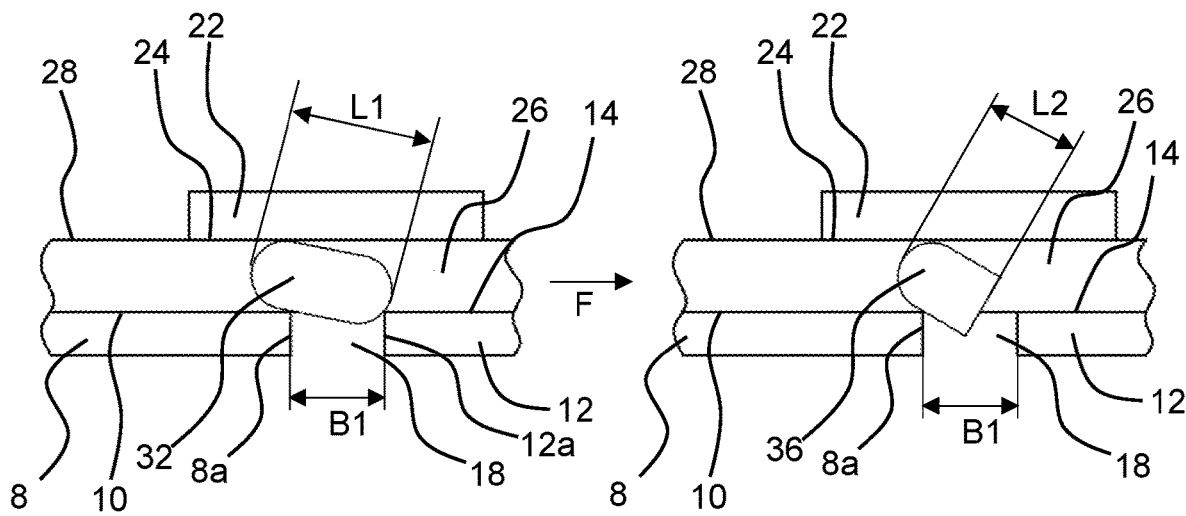
Fig. 4a                    Fig. 4b

CONVEYING DEVICE AND METHOD FOR CONVEYING BULK MATERIAL

CROSS-REFERENCE TO RELATED APPLICATIONS

This application claims the benefit of priority under 35 U.S.C. § 119 to European Patent Application No. 21 188 862.3, filed Jul. 30, 2021, the contents of which is incorporated herein by reference in its entirety.

FIELD

The present disclosure relates to a conveying device and to a method for conveying bulk material comprising a plurality of products, in particular medicinal or pharmaceutical products, and product breakage thereof.

BACKGROUND

Products present in the form of bulk material may be, for example, medicinal or pharmaceutical products, foods and food supplements. In packaging machines for packaging such products, the products are fed by means of a conveying device to a filling device which fills the products into corresponding packagings. Mention may be made for example of blister machines for packaging the products into blister packs or of bottle lines for packaging the products into bottle-like containers.

If the products are present in the form of bulk material, in addition to substantially undamaged products, this bulk material frequently also contains products which are damaged during the production, transport or filling of the conveying device, so-called product breakage. If product breakage gets into the packagings, corresponding packagings generally form rejects and are ejected and destroyed. As a result, the output of the packaging machine is reduced and costs are generated by material consumption and disposal. In addition, product breakage can lead to disruption in the conveying device, the filling device and possibly further processing stations.

To avoid this, control systems are known which recognize and separate product breakage before the actual filling of the packagings. Such control systems may comprise camera systems for recognizing product breakage, with mechanical ejecting devices or suction devices separating the recognized product breakage from the products. However, such systems are expensive and require a relatively large amount of installation space.

A more cost-effective possibility is represented by so-called perforated plates which have a plurality of holes via which products present in the form of bulk material are conveyed. In this case, product breakage is intended to fall through the holes and be separated. However, reliable separation can generally be achieved in the case of perforated plates only for very small fragments and certain product forms.

SUMMARY

It is an object of the present disclosure to provide a conveying device and a method for conveying bulk material comprising a plurality of products and product breakage thereof that allow reliable separation of product breakage and at the same time a high output.

According to an aspect of the disclosure, a conveying device for conveying bulk material, comprising a plurality of products, in particular medicinal or pharmaceutical products, and product breakage thereof, in a conveying direction comprises a first conveying element having a first conveying surface on which the bulk material can be conveyed in the conveying direction, a second conveying element having a second conveying surface on which the bulk material can be conveyed further in the conveying direction, wherein the second conveying element is arranged downstream of the first conveying element in the conveying direction, and a covering element having a covering surface which is arranged substantially parallel to the first conveying surface and to the second conveying surface and faces them in order to form at least one conveying channel for the bulk material between the first conveying surface, the second conveying surface and the covering surface. The first and the second conveying element are arranged spaced apart from one another in the conveying direction in a first position such that a gap is formed between the first and the second conveying element, wherein the covering element is arranged above the gap and above in each case a portion of the first and second conveying element which join the gap. The gap has, in the conveying direction, a first width according to a separating criterion such that the passage of product breakage through the gap is allowed and the passage of products through the gap is prevented.

The gap is therefore formed in such a way that product breakage falls through the gap whereas products are moved beyond the gap. In this way, product breakage is automatically and reliably separated while products are conveyed further without a significant influence on the output. Product breakage therefore does not get into the packagings, with the result that it is possible in this respect to dispense with control and ejection of defective packagings. The formation of the conveying channel between the covering element and the first and the second conveying element and the resulting upward delimitation of the conveying channel by the covering surface make it possible for orientation of the products in the region of the gap to be at least partially influenced and for reliable separation of the product breakage through the gap to be achieved.

The products of the bulk material are preferably medicinal or pharmaceutical products. The medicinal or pharmaceutical products can be present as solids for example in the form of (coated) tablets, capsules, oblongs, etc. The products of the bulk material may also be foods or food supplements, such as, for example, chewing gums, lozenges, sweets or the like and also minerals, vitamins, fatty acids or the like in tablet or capsule form.

"Products" are designated herein as products which are substantially intact. By contrast, "product breakage" designates damaged products which are thus no longer substantially intact. Products and product breakage are distinguished on the basis of the predefined separating criterion. The separating criterion is dependent on the product size. It can differ for different product types. It can thus be required as a result of the precisely specified dosage of an active substance contained in medicinal and pharmaceutical products that exclusively completely undamaged products are packaged and even minimally damaged products are separated. By contrast, in the case of foods, such as chewing gums or sweets, where the primary focus is on taste, it may be sufficient to separate only significantly damaged products and package the rest of the products.

The dependence of the separating criterion on the product size and the product state will become clear on the basis of the following example. Completely intact products have a predetermined dimension, such as, for example, a diameter or a length L1. Damaged products have a smaller diameter or a smaller length. It can thus be stated that slightly damaged products having a diameter or a length L2 greater than 90% of L1 still count as "good products" and products having a diameter or a length L3 less than or equal to 90% of L1 count as "bad products" and thus represent product breakage which is to be separated. For another product type, the distinction could also be made only at 60% of the length L1 or even at 95% of the length L1.

The first width of the gap is then chosen according to this predefined separating criterion in such a way that product breakage is reliably separated through the gap and products can be moved beyond the gap in an unimpeded manner as far as possible. The gap therefore has the first width in such a way that the passage of product breakage through the gap is ensured. In other words, the gap having the first width is formed in such a way that product breakage is reliably separated through the gap, that is to say a movement of product breakage beyond the gap is prevented. It is thus ensured that no product breakage passes onto the second conveying element and is therefore added to the further processing stage.

In particular, the passage of the product breakage through the gap occurs by freefall of the product breakage through the gap and thus without additional deflecting means, such as, for example, flaps, slides, air nozzles or the like which capture and remove the product breakage in a targeted manner. Likewise, the products move beyond the free gap and thus without assistance of additional supporting or deflecting means which could close or block the gap temporarily. A collecting container for collecting the product breakage can be provided below the gap.

The gap preferably extends over the entire width of the first and the second conveying surface. The width of the first and the second conveying surface is defined perpendicularly to the conveying direction and, in the case of substantially planar conveying surfaces, in a plane with the first and the second conveying surface.

It is furthermore preferred that the first and the second conveying surface are arranged substantially in a plane. This can reduce the risk that products tilt during the passage from the first to the second conveying surface and jam between the first and the second conveying element and the covering element.

A distance of the covering surface from the first or from the second conveying surface in a direction perpendicular to the covering surface defines a height of the at least one conveying channel. The height of the at least one conveying channel is preferably defined in dependence on the product size and possibly on the product geometry. For example, the at least one conveying channel can have a height which is less than two products arranged above one another on the first or second conveying surface such that the bulk material can enter the at least one conveying channel only in a single layer. If the products have different dimensions in different directions, the height of the at least one conveying channel can also be chosen in such a way that the products can enter the conveying channel only in a certain orientation or products in a certain orientation cannot enter the conveying channel.

In order to avoid jams of products at or in the gap and to allow as unhindered as possible movement of the products over the gap, the at least one conveying channel preferably has a height which prevents the products from tilting over an edge of the first conveying element that delimits the gap. The height of the at least one conveying channel is therefore preferably between 1.0 and 1.5 times, more preferably between 1.05 and 1.4 times, still more preferably between 1.1 and 1.2 times, the height of the products perpendicular to the first or second conveying surface. In particular, the at least one conveying channel has a height which is less than a length of the products in the conveying direction. This can ensure, by suitable formation of the gap and of the at least one conveying channel, as reliable a movement of the products as possible over the gap, thereby increasing the output of the conveying device.

The covering element is preferably fastened to the first and/or to the second conveying element. That is to say that the covering element is always arranged at a fixed distance from the first or second conveying surface, thereby making it possible to ensure that the predefined height of the at least one conveying channel is maintained at all times. In particular, the covering element is not movable relative to that one of the first and second conveying elements to which it is fastened. However, in order to allow access to the gap, the covering element can be releasably connected to the respective one of the first and the second conveying element.

The first and the second conveying element are preferably in plate form. Each conveying element can then be a substantially rectangular plate, for example made of metal or plastic. An upper side of the first and of the second conveying element comprises the first or the second conveying surface. The bulk material is moved on the first and the second conveying surface relative to the first or second conveying element, for example by means of vibrations of the conveying elements. The first and the second conveying element in particular comprise no conveyor belt or other movable conveying means for transporting products in which the products as a rule do not move relative to the conveying surfaces in the conveying direction. Thus, the first and the second conveying element can be formed in as simple a manner as possible.

The conveying device is preferably a vibratory conveyor, for example in the form of a vibrating trough, as is known for conveying bulk material, in particular medicinal and pharmaceutical products. The first and the second conveying element then form part of the vibrating trough.

The conveying device can comprise a drive device which is coupled to the first or the second conveying element in order to set them in vibration. The drive device is preferably coupled to the first conveying element, and the first and the second conveying element are connected to one another to transmit the vibrations.

In general, it is preferred that the first and the second conveying element are formed as separate components. They can be connected to one another. In particular, the first and the second conveying element are movably connected to one another for example in such a way that the first and the second conveying element are movable relative to one another parallel to the conveying direction.

In a particularly preferred embodiment, the first and/or the second conveying element are movable relative to one another in the conveying direction and the width of the gap is adjustable. In particular, the first and/or the second conveying element are movable relative to one another exclusively in the conveying direction. The first and the second conveying surface then remain substantially in a plane while the width of the gap is adjustable. The adjustability of the gap makes it possible for the conveying device to be adapted in a particularly simple manner to the predefined separating criterion and to different product sizes and geometries.

The fact that the first and/or the second conveying element are movable relative to one another makes it possible to ensure that only one of the two conveying elements is movable relative to the other conveying element. The second conveying element is preferably movable back and forth relative to the first conveying element, whereas the first conveying element is not movable with respect to the second conveying element. However, both conveying elements can also be movable.

For this purpose, the conveying device can comprise at least one actuating drive which moves the first and the second conveying element relative to one another. The actuating drive can be, for example, a hydraulic, pneumatic, electric or mechanical linear drive. Preferably, a positionally fixed constituent part of the at least one actuating drive is connected to the first conveying element and a movable constituent part of the at least one actuating drive is connected to the second conveying element.

In order to release products which are possibly jammed in the region of the gap, it is furthermore preferred that the first and the second conveying element are movable relative to one another between the first position and a second position in the conveying direction, wherein the gap in the second position has a second width which is greater than the first width. If the gap has the second width, the passage of products through the gap is made possible. Products jammed in the region of the gap therefore fall through the gap, with the result that the jam is released. Releasing jams in as a reliable a manner as possible can be achieved if the second width is greater than a maximum dimension of the products in the conveying direction.

The conveying device can be designed to move the first and the second conveying element from the first position into the second position at predefined time intervals, to leave them in the second position for a predefined period and then to move them back into the first position. Jams which are possibly present are then automatically released without any need for sophisticated recognition of products and jams and a corresponding controller. However, the first and the second conveying element can also be moved from the first position into the second position under sensor control, as will be described in more detail herein with reference to suitable sensors.

In a preferred embodiment, the at least one conveying channel is subdivided into a plurality of conveying channels such that the conveying device has a plurality of conveying channels which extend in the conveying direction and are arranged next to one another in a direction transversely to the conveying direction. The features described with respect to the at least one conveying channel, in particular relating to the height thereof, apply analogously to the plurality of conveying channels. The conveying device preferably has the plurality of conveying channels at least in the portion of the first conveying element that is covered by the covering element. However, the plurality of conveying channels can also extend on the first conveying element beyond the covering element and optionally on the second conveying element. The conveying channels of the plurality of conveying channels can have, for example, a rectangular, V-shaped or U-shaped cross section.

With particular preference, the conveying channels of the plurality of conveying channels are formed in such a way that precisely one row of successively arranged products can move through a conveying channel. However, two or more products next to one another do not fit into a conveying channel. Therefore, a width of each conveying channel of the plurality of conveying channels is preferably less than the width of two products, with the width being defined in each case in a direction perpendicular to the conveying direction and perpendicular to the height of the conveying channels.

The gap preferably extends over the width of a plurality of conveying channels, particularly preferably over the width of all conveying channels and thus over the entire width of the first conveying surface. If the gap does not extend over the entire width of all conveying channels, there is provided at least one second gap which extends over the remaining width. All conveying channels of the plurality of conveying channels lead to the gap or to a gap such that separation of product breakage in the conveying device is ensured.

To form the plurality of conveying channels, the conveying device can further comprise a plurality of guide elements which extend in the conveying direction, are arranged next to one another in a direction transversely to the conveying direction and laterally delimit the plurality of conveying channels for the bulk material transversely to the conveying direction, that is to say in a first transverse direction perpendicular to the conveying direction and perpendicular to the height of the conveying channels. The plurality of guide elements preferably extend at least in the portion of the first conveying element that is covered by the covering element up to the gap.

A second transverse direction is defined perpendicular to the conveying direction and parallel to the height of the conveying channels or perpendicular to the covering surface. The covering element can upwardly delimit the plurality of conveying channels, that is to say parallel to the second transverse direction. The first conveying surface and optionally also the second conveying surface can downwardly delimit the plurality of conveying channels in a portion of the first or second conveying element that adjoins the gap.

In order to move the products as reliably as possible over the gap and to further reduce the risk of a jam, it is preferred that the plurality of guide elements also extends over the gap. It can thus be ensured that the orientation of the products in the conveying direction during the movement of the products over the gap is not influenced in the first transverse direction.

It may be desirable that the plurality of guide elements are arranged only in a portion of the first conveying element that is situated downstream with respect to the conveying direction and no guide elements are provided in a portion of the first conveying element that is situated upstream. The bulk material can thus be guided onto the first conveying element in the upstream portion and the products of the bulk material and the product breakage contained therein can be inserted into the conveying channels in the course of conveying the bulk material in the conveying direction.

The plurality of guide channels may, for example, be formed by a plurality of strips which are preferably mounted on an upper side of the first conveying element. However, it is also conceivable that a plurality of grooves for forming the plurality of conveying channels are incorporated in the upper side of the first conveying element. Side walls of the grooves that remain between the grooves then form the plurality of guide elements. Analogously, the plurality of guide elements can also be formed on the second conveying element.

The plurality of guide elements are preferably fastened or mounted on the first conveying element and project beyond the first conveying element in the conveying direction, with the result that the plurality of guide elements extend over the gap. With particular preference, the plurality of guide elements extend over the gap and at least partially over the second conveying element. In this way, the products are reliably guided over the gap. The plurality of guide elements are then preferably not connected to the second conveying element such that the latter continues to be movable relative to the first conveying element.

A distance between in each case two adjacent guide elements of the plurality of guide elements defines a width of a conveying channel of the plurality of conveying channels that is delimited by the two adjacent guide elements.

The conveying channels of the plurality of conveying channels preferably each have a width and a height such that the products have a predefined orientation with respect to the conveying direction and maintain it at least in the region of the plurality of guide elements. The products therefore fit only into a conveying channel when they are oriented in the predefined orientation. As long as the products are oriented in an orientation deviating from the predefined orientation, they do not pass into the plurality of conveying channels and are held back in front of them.

It is preferred that a first dimension of the products in the predefined orientation is defined parallel to the conveying direction, with the separating criterion being defined in dependence on the first dimension. For example, the first dimension of the products can correspond to a length of the products and the separating criterion can be defined as described at the outset.

In the case of elongate products, the length is the largest dimension of the products. In this case, the conveying channels can have a width and a height which are less than the length of the products. In this way, products can only enter the conveying channels if their longitudinal direction is oriented parallel to the conveying direction.

The height of each conveying channel of the plurality of conveying channels is preferably between 1.0 and 1.5 times, more preferably between 1.05 and 1.4 times, still more preferably between 1.1 and 1.2 times, the height of the products in the predefined orientation.

The width of each conveying channel of the plurality of conveying channels is preferably between 1.0 and 1.5 times, more preferably between 1.05 and 1.4 times, still more preferably between 1.1 and 1.2 times, the width of the products in the predefined orientation.

The conveying device preferably has an orienting device which is designed to orient the products of the bulk material, in particular in the first predefined orientation. For this purpose, the orienting device is preferably arranged directly in front of the plurality of guide elements upstream with respect to the conveying direction or at a start of the plurality of guide elements, for example above a starting portion of the plurality of guide elements. Products which are not oriented as desired are held back by the orienting device, remain in front of the orienting device and are reoriented. The orienting device can comprise, for example, a roller, in particular a cloth roller or a brush roller, or a brush, and have a longitudinal axis which extends parallel to the first transverse direction.

The orienting device is arranged relative to the first conveying surface in such a way that it engages with the bulk material conveyed in the conveying direction. By engagement with the orienting device, the products of the bulk material and the product breakage contained therein are reoriented and products pass through the plurality of guide elements as soon as they have assumed the desired orientation. Depending on the size of the product breakage, the latter can pass into the plurality of conveying channels in any orientation or independently of a desired orientation.

The orienting device also has the effect that the bulk material downstream of the orienting device is arranged in only one layer.

In a particularly preferred embodiment, the conveying device comprises at least one sensor for recognizing jams of bulk material, in particular of products but possibly also of product breakage, in the gap. As a result, the gap can be opened to the second width in a targeted manner if a jam to be released is recognized. An opening of the gap at regular time intervals that is associated with the separation of intact products and thus a reduction in the output can then be dispensed with.

In this embodiment, the actuating drive, which moves the first and the second conveying element relative to one another, can be designed to move the first and the second conveying element relative to one another from the first position into the second position in response to a signal from the at least one sensor. For example, the conveying device comprises a control device and the at least one sensor is designed to transmit a signal to the control device that is characterizing for a jam of a product, and the control device is designed to actuate the actuating drive in response to the signal obtained in order to open the gap.

The at least one sensor can be designed and arranged in different ways, as described below. The at least one sensor is preferably designed in such a way that it recognizes jams in all conveying channels of the plurality of conveying channels. For this purpose, precisely one sensor or a plurality of sensors can be provided. In the case of a plurality of sensors, each sensor is preferably assigned to part of the plurality of conveying channels. The sensors of the plurality of sensors can all be designed and arranged according to one of the embodiments described below or be combined in any desired manner from these embodiments.

In a first embodiment, the at least one sensor can be arranged above the gap and designed to detect bulk material or product breakage dwelling in the gap. In particular, the at least one sensor can be arranged above the covering element, which is then preferably designed to be at least partially or completely transparent. To detect a bulk material or product breakage dwelling in the gap, the at least one sensor can be designed to recognize a bulk material or the product breakage in the region of the gap and to detect a time period for which the bulk material or the product breakage is situated in the region of the gap. If the detected time period exceeds a predefined limit value, a jam can be assumed and such a jam is recognized. The at least one sensor could also register a movement of the recognized products in the conveying direction and recognize a jam if a movement of a recognized product is no longer detected.

In a second embodiment, the at least one sensor can be arranged in the gap or below the gap, preferably below the first and/or the second conveying element, and be designed to detect bulk material dwelling in the gap or the passage of bulk material through the gap. For example, the at least one sensor in this embodiment is designed as a light barrier, with the light preferably being arranged in the gap. If product breakage falls through the gap, the passage of bulk material is recognized in that the light beam is briefly interrupted. If a product or large product breakage tilts into the gap and jams, the product dwelling in the region of the gap or the product breakage is for example recognized by virtue of the light beam being interrupted for a relatively long time or permanently.

In a third embodiment, the at least one sensor is arranged upstream of the gap with respect to the conveying direction, preferably upstream of the covering element, and designed to detect accumulating bulk material. If, for example, a product jams in the gap or in one of the plurality of conveying channels, it blocks following products and product breakage. The bulk material accumulates as a result. The at least one sensor can be designed to detect the bulk material in front of the covering element and to recognize that the bulk material accumulates or does not move further in the conveying direction. A jam can then be assumed and such a jam is recognized.

In the first and the third embodiment, the at least one sensor can be formed, for example, as an optoelectronic sensor.

In a fourth embodiment, the at least one sensor can be arranged downstream of the gap with respect to the conveying direction, preferably be assigned to a processing station following the conveying device, and be designed to detect a decreasing output of the conveying device. For example, the at least one sensor in this embodiment is designed as a filling level sensor in a following processing station that is designed to recognize that too few products are fed from the conveying device, with the result that a jam of products in the conveying direction can be inferred.

According to another aspect of the present disclosure, a blister machine having a conveying device as described above is provided. The blister machine comprises a product store for receiving bulk material comprising a plurality of products, in particular medicinal or pharmaceutical products, and product breakage thereof, a conveying device as described above for separating product breakage and conveying the products in a conveying direction, and a filling station for filling the products into blisters. The product store is designed to dispense the bulk material onto the conveying device, in particular onto the first conveying element, and the conveying device is designed to convey the products of the bulk material to the filling station. All the features and advantages described herein with respect to the conveying device therefore also apply to the blister machine, and vice versa.

The blister machine can further comprise a forming station for forming the blisters into a forming film, which forming station is arranged upstream of the filling station, and a sealing station for sealing a cover foil onto the forming film, which sealing station is arranged downstream of the filling station. In addition, the blister machine can comprise a punching station for punching blister packs out of the film-foil composite of forming film and cover foil.

According to another aspect of the disclosure, a method for conveying and sorting bulk material comprising a plurality of products, in particular medicinal or pharmaceutical products, and product breakage thereof, comprises the following steps:

conveying the bulk material on a first conveying surface in a conveying direction to a gap which has, in the conveying direction, a first width according to a predefined separating criterion such that the passage of product breakage through the gap is allowed and the passage of products through the gap is prevented;

moving the products in the conveying direction beyond the gap onto a second conveying surface and separating product breakage through the gap; and conveying the products on the second conveying surface further in the conveying direction.

The gap is therefore formed in such a way that product breakage falls through the gap, whereas products are moved beyond the gap. In this way, product breakage is automatically and reliably sorted out, whereas products are conveyed further without significantly influencing the output.

For the bulk material, the products, the product breakage, the separating criterion and the formation of the gap, the definitions, statements and advantageous features given at the outset apply analogously and independently of the design of the conveying device.

With particular preference, the method is carried out by the conveying device described above or a blister machine comprising a conveying device as described above. All the features and advantages described in conjunction with the conveying device and the blister machine can therefore be analogously applied to the method, and vice versa.

The separation of product breakage preferably comprises the freefall of the product breakage through the gap, in particular without product breakage being captured and removed by means of additional deflecting means, such as, for example, flaps, slides, air nozzles or the like. The movement of the products occurs over the free gap and thus without additional assistance by further supporting or deflecting means which will temporarily close or block the gap. This results in a very reliable but nevertheless simple and cost-effective possibility for separating the product breakage that manages without additional components to be driven and to be controlled.

The movement of the products over the gap can comprise the lateral guidance of the product in the region of the gap, for example by means of the plurality of guide elements, in order to ensure a certain orientation of the products and to reduce the risk of jamming of the products in the region of the gap.

The movement of the products over the gap can also comprise the prevention of tilting of the products into the gap, in particular by means of holding down the products in the region of the gap, for example by means of the covering element. It is also possible in this way to reduce the risk of jams in the region of the gap.

The lateral guidance of the products and the prevention of tilting of the products ensure that the products substantially maintain an orientation (for example the predefined orientation) imparted to them when moving above the gap and as a result are moved over the gap in a reliable manner and without jamming.

In a preferred embodiment, the conveying of the bulk material to the gap further comprises:

orienting the products of the bulk material, preferably by means of the orienting device, with the result that the products have the predefined orientation with respect to the conveying direction, wherein the first dimension of the products in the predefined orientation is defined parallel to the conveying direction, wherein the separating criterion is defined in dependence on the first dimension;

guiding the products of the bulk material to the gap such that the products maintain the predefined orientation.

In this way, the products always pass to the gap in the predefined orientation, with the result that the first width of the gap and the separating criterion can be chosen in dependence on the first dimension and reliable separation is ensured.

The movement of the products beyond the gap can then comprise the guidance of the products over the gap in such a way that the products substantially maintain the predefined orientation, for example by means of the lateral guidance and the prevention of tilting, as described above.

The fact that the products maintain the predefined orientation mean that the products have the predefined orientation both directly upstream and directly downstream of the gap. The products can also have the predefined orientation in the region of the gap. By virtue of small distances of the products from the guide elements and from the covering element and by virtue of tolerances in the dimensions of the products, it is possible, however, that the products tilt to a minimum degree when crossing the edges of the first and the second conveying element that limit the gap. However, further tilting is directly prevented, as described above.

Before conveying the bulk material to the gap, the method can further comprise the defining of the separating criterion or the selection of a suitable separating criterion, in particular as described by way of example at the outset.

With particular preference, the method comprises, before conveying the bulk material to the gap, the setting of the first width of the gap according to the predefined separating criterion. The setting of the first width can comprise the movement of the first and second conveying element relative to one another, for example by moving the second conveying element with respect to the first conveying element.

The setting of the first width can occur manually or automatically by means of the control device on the basis of a width input by a user, a width selected by the user or a separating criterion predetermined by the user.

In order to release any jams, the method preferably comprises opening the gap from the first width to a second width which is greater than the first width, preferably by means of the actuating drive. The opening of the gap can occur at predetermined time intervals or else, as described above, under sensor control.

In a particularly preferred embodiment, the method therefore further comprises:

recognizing a jam of a product or product breakage of the bulk material in the gap by means of at least one sensor;

providing a signal characterizing a jam by means of the at least one sensor if a jam is recognized; and opening the gap to the second width in response to the signal in order to release the jam.

The at least one sensor preferably provides the signal to the control device which controls the actuating drive to open the gap in response to the signal. The opening of the gap then occurs by means of the actuating drive. The recognition of a jam can also occur jointly by means of the at least one sensor and the control device. For example, the control device can make a comparison of actual values which are determined by the sensor with setpoint values.

The at least one sensor can be selected from the embodiments of sensors that have already been described. A plurality of sensors according to one of these embodiments or from a combination of these embodiments can also be provided.

The recognition of a jam in the gap can occur in different ways. According to one embodiment, the recognition of a jam comprises detecting a time period for which the products or the product breakage are situated in the region of the gap, comparing the detected time period with a predetermined limit value, and determining a jam if the detected time period is greater than the predefined limit value. To detect the time period, first of all the products or the rough product breakage can be recognized. In this case, the at least one sensor is preferably designed according to the above-described first embodiment.

According to another embodiment, the recognition of a jam comprises detecting a passage of product breakage through the gap and determining a jam if no passage is detected or passage can no longer be detected, for example because a product blocks the at least one sensor. In this case, the at least one sensor is preferably designed according to the above-described second embodiment.

According to a further embodiment, the recognition of a jam comprises detecting the bulk material upstream of the gap, recognizing accumulating bulk material upstream of the gap, and determining a jam if accumulating bulk material is recognized. In this case, the at least one sensor is preferably designed according to the above-described third embodiment.

According to yet another embodiment, the recognition of a jam comprises detecting the plurality of products of the bulk material downstream of the gap, recognizing a decreasing output of the products downstream of the gap and determining a jam if a decreasing output is recognized. In this case, the at least one sensor is preferably designed according to the above-described fourth embodiment.

BRIEF DESCRIPTION OF THE DRAWINGS

FIG. 3 is a sectional view of the conveying device along the line III-III in FIG. 2.

FIGS. 4a, b are side views of the conveying device according to FIG. 1 in the region of a gap.

DETAILED DESCRIPTION

Figure 1:
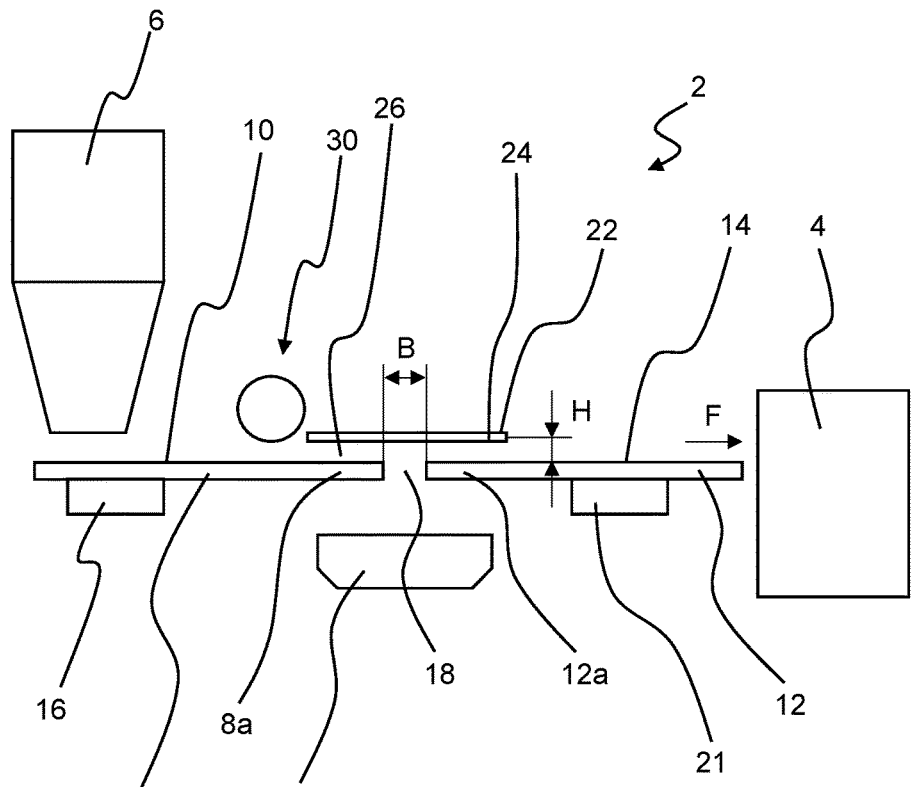
FIG. 1 is a schematic side view of an embodiment of a conveying device according to the disclosure.
Figure 9:
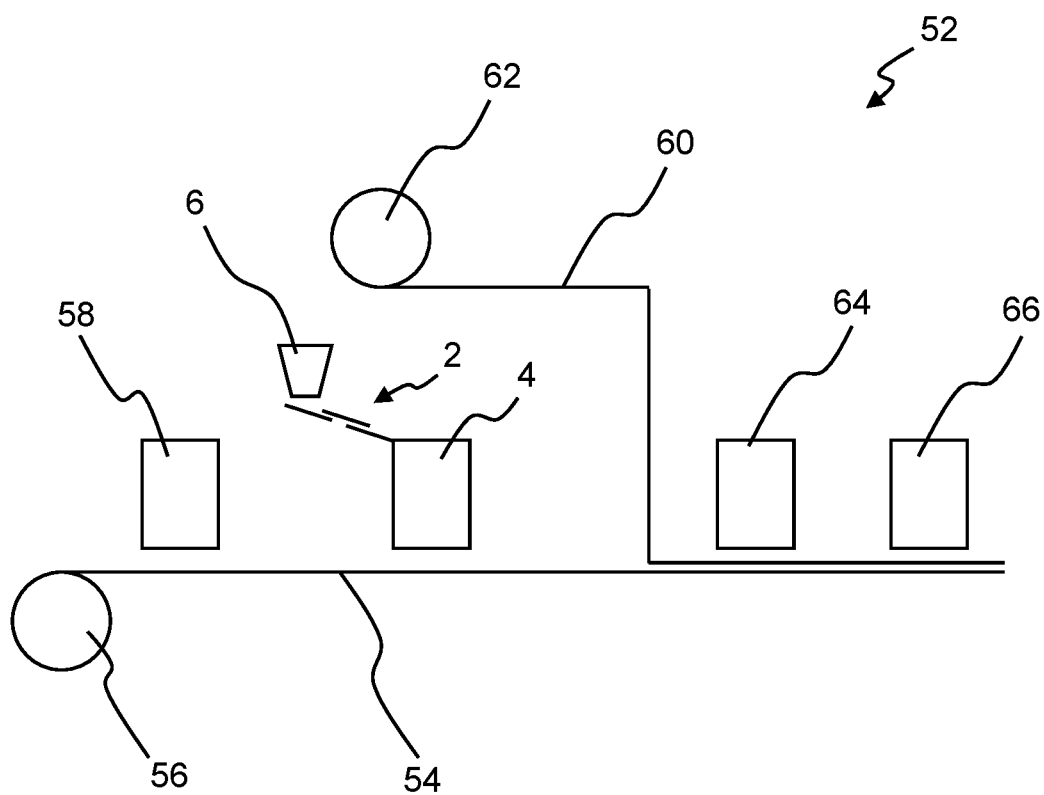
FIG. 9 is a schematic illustration of a blister machine having a conveying device according to the disclosure.

FIG. 1 schematically shows an embodiment of a conveying device 2 according to the disclosure in a side view. The conveying device 2 is designed to feed products present in the form of bulk material to a processing station 4. In addition to the products, the bulk material also comprises product breakage which is to be separated during transport to the processing station 4 in order for only products of predetermined quality to be further processed. The processing station 4 can be, for example, a filling station of a blister machine, as explained with reference to FIG. 9.

The bulk material comprising a plurality of products, in particular medicinal or pharmaceutical products, and product breakage thereof is provided, for example, in a product store 6. The product store 6 is designed to receive the bulk material and to dispense it onto the conveying device 2.

The conveying device 2 comprises a first conveying element 8, which has a first conveying surface 10, and a second conveying element 12, which has a second conveying surface 14. The first and the second conveying surface 10, 14 are arranged on the upper side of the respective conveying element 8, 12. The bulk material is conveyed on the first conveying surface 10 and the second conveying surface 14 in a conveying direction F. The second conveying element 12 is arranged downstream of the first conveying element 8 in the conveying direction F.

The first and the second conveying element 8, 12 can be in plate form, as is known of vibratory conveyors, for example. Here, the bulk material is advanced by vibrations of the first and second conveying element 8, 12 relative to the conveying surfaces 10, 14. To generate the vibrations, the conveying device 2 can have a drive device 16 which is coupled to one of the first and the second conveying element 8, 12, here to the first conveying element 8. To transfer the vibrations from the first to the second conveying element 8, 12, the latter can be connected to one another, as revealed, for example, in FIGS. 5 and 6.

The first and the second conveying element 8, 12 are arranged spaced apart from one another in the conveying direction F such that a gap 18 having a width B is formed between the first and the second conveying element 8, 12. In a first position of the first and the second conveying element 8, 12, the gap 18 has a first width B1. The first width B1 is chosen according to a predefined separating criterion in such a way that product breakage falls through the gap 18 and products move beyond the gap 18 in order in this way to separate the product breakage and to further process only products of sufficient quality. Below the gap 18 there can be arranged a collecting container 20 for receiving the product breakage which falls through the gap 18.

The width B of the gap 18 is particularly preferably adjustable in order to be able to adjust it according to the predefined separating criterion and to be able to release products which may jam in the region of the gap 18. For this purpose, the first and the second conveying element 8, 12 are movable relative to one another in the conveying direction F, as described in more detail with reference to FIGS. 6a and 6b. In the exemplary embodiment illustrated, an actuating drive 21 is provided which is at least coupled to the second conveying element 12 in order to move it with respect to the first conveying element 8.

The conveying device 2 further comprises a covering element 22 having a covering surface 24 which is arranged substantially parallel to the first conveying surface 10 and to the second conveying surface 12 and faces them. The covering element 22 is arranged above the gap 18 and above in each case a portion 8a, 12a of the first and second conveying element 8, 12 that adjoin the gap 18. Substantially parallel means the surfaces are within 2°, 5°, 10° or 15° of parallel to one another.

The covering surface 24, the first conveying surface 10 and the second conveying surface 14 form at least one conveying channel 26 in which the bulk material on the first conveying surface 18 is conveyed to the gap 18 and products on the second conveying surface 14 are conveyed further in the conveying direction F. The at least one conveying channel 26 has a height H which is defined by the distance of the covering surface 24 from the conveying surfaces 10, 14 and perpendicular to the covering surface 24.

In order to ensure as far as possible a reliable separation of the product breakage or movement of the products over the gap 18, the products in the region of the gap 18 preferably have a predefined orientation. On the one hand, for this purpose, the at least one conveying channel 26 can have a height H such that products fit only in a certain orientation into the at least one conveying channel 26 or products of certain orientation(s) do not fit into the at least one conveying channel 26.

Additionally or alternatively, the conveying device 2 can comprise a plurality of guide elements 28 and/or an orienting device 30 which is arranged upstream of the covering element 22 with respect to the conveying direction F, as described in detail below with reference to FIG. 2 and FIG. 3.

Figure 2:
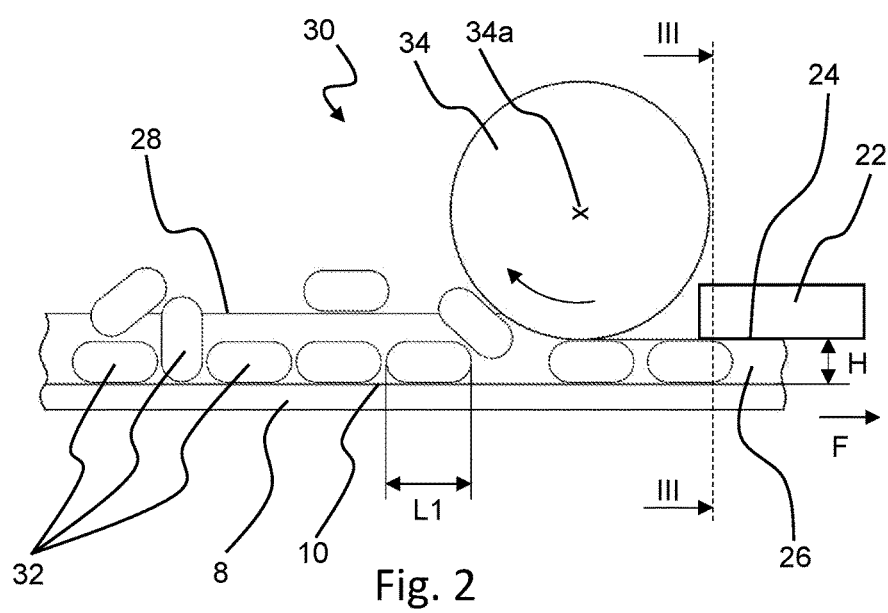
FIG. 2 is a schematic side view of an orienting device of the conveying device according to FIG. 1.

In FIG. 2 there can be seen products 32 of the bulk material upstream and downstream of the orienting device 30 with respect to the conveying direction F. FIG. 3 is a sectional view of the conveying device 2 in the region of the first conveying element 8 and of the covering element 22 along the line III-III in FIG. 2.

The orienting device 30 can for example comprise a roller 34 which can be in the form of a cloth roller or brush roller. The roller 34 is arranged in such a way that its longitudinal axis 34a extends perpendicularly to the conveying direction F and parallel to the first conveying surface 10. Upstream of the orienting device 30, the bulk material can be arranged in an unordered manner and in multiple layers on the first conveying element 8. The roller 34 is arranged in such a way that it engages with the bulk material conveyed in the conveying direction F, with the result that the bulk material is partially held back and reoriented. The roller 34 advantageously rotates for this purpose. A direction of rotation of the roller 34 is preferably oppositely directed to the conveying direction F in the region of engagement with the bulk material.

Moreover, the roller 34 can delimit the passage between the roller 34 and the first conveying surface 10 in such a way that the bulk material or the products 32 are conveyed further only in a single layer. The passage is preferably already limited to the height H of the at least one conveying channel 26. Furthermore, the orienting device 30 can be arranged above the plurality of guide elements 28 and reorient the bulk material until the products 32 and the product breakage enter the conveying channels 26 between the guide elements 28.

As can be seen in FIG. 3, the plurality of guide elements 28, of which three guide elements 28a, 28b, 28c are illustrated here, subdivides the conveying channel 26 into a plurality of conveying channels, of which three conveying channels 26a, 26b, 26c can be seen. Both the plurality of conveying channels 26 and the plurality of guide elements 28 run in the conveying direction F and are arranged next to one another in a first transverse direction Q1 perpendicular to the conveying direction F and parallel to the first conveying surface 10 or to the covering surface 24. The plurality of guide elements 28 delimits the plurality of conveying channels 26 in the first transverse direction Q1. The covering element 22 upwardly delimits the plurality of conveying channels 26 and the first conveying surface downwardly delimits the plurality of conveying channels 26. Therefore, each conveying channel 26a, 26b, 26c is laterally delimited by two guide elements 28a, 28b, 28c and upwardly and downwardly delimited by the covering surface 24 and the first conveying surface 10. A distance between two adjacent guide elements 28a, 28b defines a width BF of the plurality of conveying channels 26.

As illustrated in FIGS. 2 and 3, the plurality of conveying channels 26 can have a width BF and a height H in such a way that the products 32 have a predefined orientation with respect to the conveying direction F and maintain it at least in the region of the plurality of guide elements 28. For this purpose, the width BF and the height H of the plurality of conveying channels 26 are not substantially greater than a width of the products 32 and a height of the products 32, with the result that tilting of the products about an axis parallel to the conveying direction F is avoided. In particular, the width BF of the plurality of conveying channels 26 is here less than a height of the products 32 and both the width BF and the height H of the plurality of conveying channels 26 are less than the length L of the products 32. The products 32 can therefore be received in the conveying channels 26 only in the illustrated, predefined orientation.

A first dimension of the products 32, here a length L1 of the products 32, is defined parallel to the conveying direction F in the predefined orientation. The separating criterion is preferably defined in dependence on this first dimension.

The separation of product breakage 36, illustrated by way of example in FIG. 4b by way of a segment 36 of a product 32, will now be explained in more detail with reference to FIGS. 4a and 4b. First of all, the bulk material comprising a plurality of products 32 and product breakage 36 thereof is conveyed on the first conveying surface 10 in the conveying direction F to the gap 18. Here, as has just been described, the bulk material can be presorted or oriented by means of the orienting device 30. On arrival at the gap 18, products 32 are moved beyond the gap 18, as illustrated in FIG. 4a, whereas product breakage 36 falls through the gap 18 and is thereby separated, as illustrated in FIG. 4b.

For this purpose, the first width B1 of the gap 18 is set according to the predefined separating criterion in such a way that the products 32 move beyond the gap 18. Here, the width B1 is less than the length L1 of the products 32 in the predefined orientation and the products 32 are guided in the region of the gap 18 in such way that they substantially maintain the predefined orientation. As a result, the products 32 cannot fall through the gap 18. In particular, the covering element 22 prevents a situation in which the products 32 tilt into the gap 18 over an edge 8b of the first conveying element 8 that delimits the gap 18. By virtue of the slight play between the products 32 and the first conveying surface 10 and also the covering surface 24 and of a tolerance in the size of the products 32, the products 32 can at most tilt slightly, but are then blocked by the covering element 22 and reliably move further in the conveying direction F over the gap 18.

If the separating criterion is defined for example such that only products having a length L greater than 90% of the length L1 of intact products 32 are to be further processed, all segments of products having a length L2 less than 90% of the length L1 form product breakage 36, such as, for example, the segment 36 illustrated in FIG. 4b. The first width B1 of the gap 18 is then set such that product breakage 36 falls through the gap 18 and is thereby separated from the products 32. Therefore, the width B1 of the gap should not be substantially less than 90% of the length L1. In order to allow reliable separation according to the predefined separating criterion, the first width B1 in this exemplary embodiment should be approximately 90% of the length L1.

Figure 5:
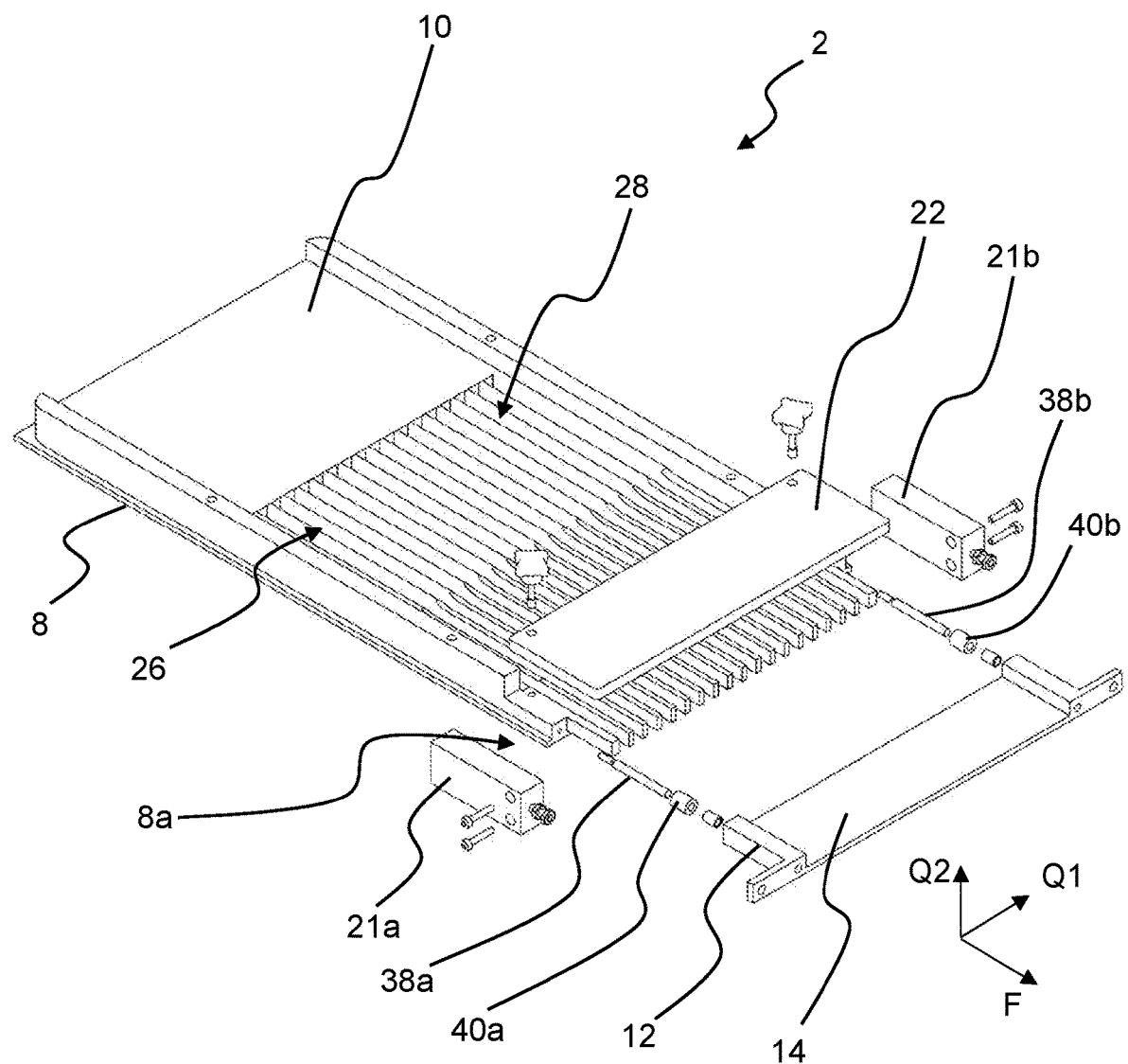
FIG. 5 is a perspective view of key components of the conveying device according to FIG. 1.

In FIG. 5, the key components of the conveying device 2 are illustrated in more detail in a perspective view. There can be seen the first conveying element 8, the second conveying element 12 and the covering element 22. The features described in relation to the individual components are predominantly independent of the design of the respective other components.

The first conveying element 8 is substantially in plate form. The plurality of guide elements 28 are arranged on the first conveying element 8 or on the first conveying surface 10 in order to form the plurality of conveying channels 26. In this case, the plurality of guide elements 28 extend only in a downstream portion of the first conveying element 8, whereas no guide elements 28 are provided in an upstream portion of the first conveying element 8, and the first conveying surface 10 is designed to be substantially planar. The product store 6 dispenses the bulk material onto the first conveying element 8 in this upstream portion. The plurality of guide channels 26 can take the form of grooves which are incorporated in the upper side of the first conveying element 8. Thus, at least some of the bulk material already falls into the guide channels 26 in a certain orientation during conveyance in the conveying direction F.

The covering element 22 is here fastened to the first conveying element 8. In order to obtain access to the gap 18, the covering element 22 is preferably releasably connected to the first conveying element 8, in particular screwed to the first conveying element 8. Here, the covering element 22 covers the plurality of conveying channels 26 in the portion 8a of the first conveying element 8 that adjoins the gap 18.

Figure 6A:
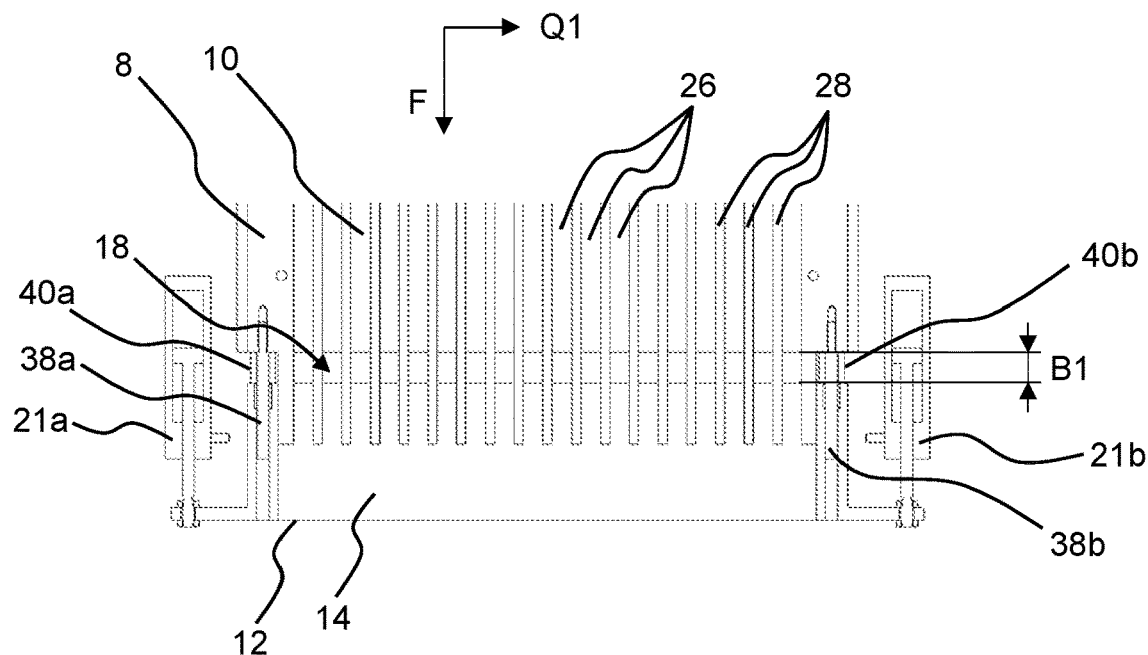
FIGS. 6a, b are plan views of a section of the conveying device in the region of the gap.
Figure 6B:
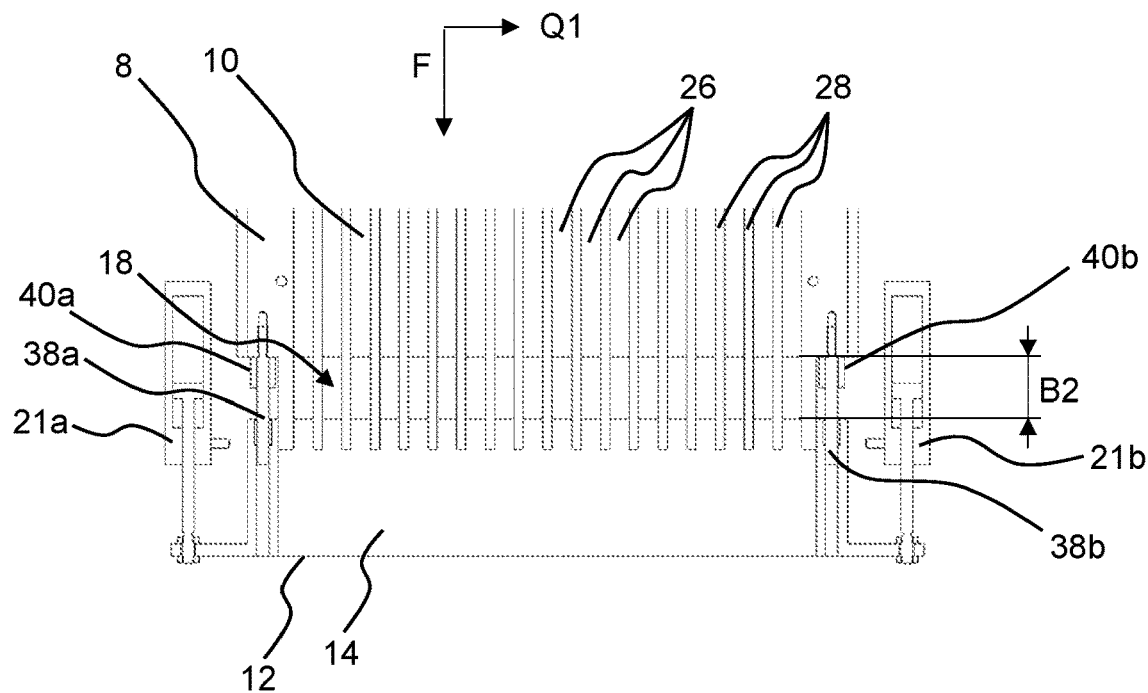

With respect to the second conveying element 12, reference is simultaneously made to FIGS. 6a and 6b which show a corresponding plan view of the components illustrated in FIG. 5 in the region of the gap 18. Here, the covering element 22 is blanked out.

The second conveying element 12 is likewise in plate form and the second conveying surface 14 is substantially planar. The plurality of guide elements 28 can extend beyond the first conveying element 8 and at least partially over the second conveying element 12 in order also to form the plurality of conveying channels 26 at least in the upstream portion 12a of the second conveying element 12 that adjoins the gap 18. The covering element 22 also extends up and into the portion 12a of the second conveying element 12.

In order to be movable with respect to the first conveying element 8, the second conveying element 12 can be movably connected to the first conveying element 8. As illustrated, the second conveying element 12 can be mounted so as to be displaceable on two guide pins 38a, b which in turn are fastened to the first conveying element 8. There can also be provided stop elements which limit the movement of the second conveying element 12 toward the first conveying element 8 and thereby precisely define the width of the gap 18. The stop elements can be formed, for example, as spacer sleeves 40a, b which are arranged on the guide pins 38a, b. However, it is also conceivable that the width B of the gap 18 can be precisely set without stop elements such that the latter can be dispensed with.

To move the second conveying element 12, two actuating drives 21a, b are provided here which are coupled to the second conveying element 12. In the illustrated exemplary embodiment, the actuating drives 21a, b take the form of pneumatic or hydraulic cylinders whose piston rods are connected to the second conveying element 12. The actuating drives 21a, b can therefore move the second conveying element 12 parallel to the conveying direction F. It will be understood that just one guide pin 38, more than two guide pins 38a, b or similar guide means and also just one actuating drive 21 or more than two actuating drives 21a, b can be provided.

In FIG. 6a, the first and the second conveying element 8, 12 are situated in a first position in which the width of the gap 18 corresponds to the first width B1 which is set according to the predefined separating criterion. The first width B1 can be determined as the minimum width of the gap 18 by means of the spacer sleeves 40a, b. To adapt the minimum width of the gap 18 in dependence on the predefined separating criterion, the spacer sleeves 40a, b can be interchanged.

In FIG. 6b, the first and the second conveying element 8, 12 are situated in a second position in which the gap 18 has a second width B2 which is greater than the first width B1. The gap 18 is opened by moving the second conveying element 12 relative to the first conveying element 8 from the first position into the second position. As a result, products 32 which may have jammed in the region of the gap 18 can be released and separated through the gap 18. It can be seen that the plurality of guide elements 28 preferably extend over the gap 18 up to the second conveying element 12 both in the first position and in the second position.

The actuating drives 21a, b can move the second conveying element 12 from the first position into the second position and back again at regular time intervals in order to automatically release any jams that occur. Although this represents a possibility for releasing jams that can be realized in a simple and cost-effective manner, it results upon each opening in the loss of products 32 through the gap 18 and thus in a reduction in the output.

The opening of the gap 18 to remove jams of products 32 therefore preferably occurs under sensor control, with the result that the gap 18 is opened only when a jam is actually determined. For this purpose, the conveying device 2 can comprise at least one sensor for recognizing jams of bulk material in the gap 18. Various embodiments of the at least one sensor 42, 44, 46, 48 are described below with reference to FIG. 7 and FIG. 8. The sensors 42, 46, 48 are illustrated jointly in FIG. 7 only for reasons of simpler illustration. It will be understood that only at least one sensor according to one of these embodiments can be provided. However, a combination of sensors of the various embodiments is also conceivable.

Figure 7:
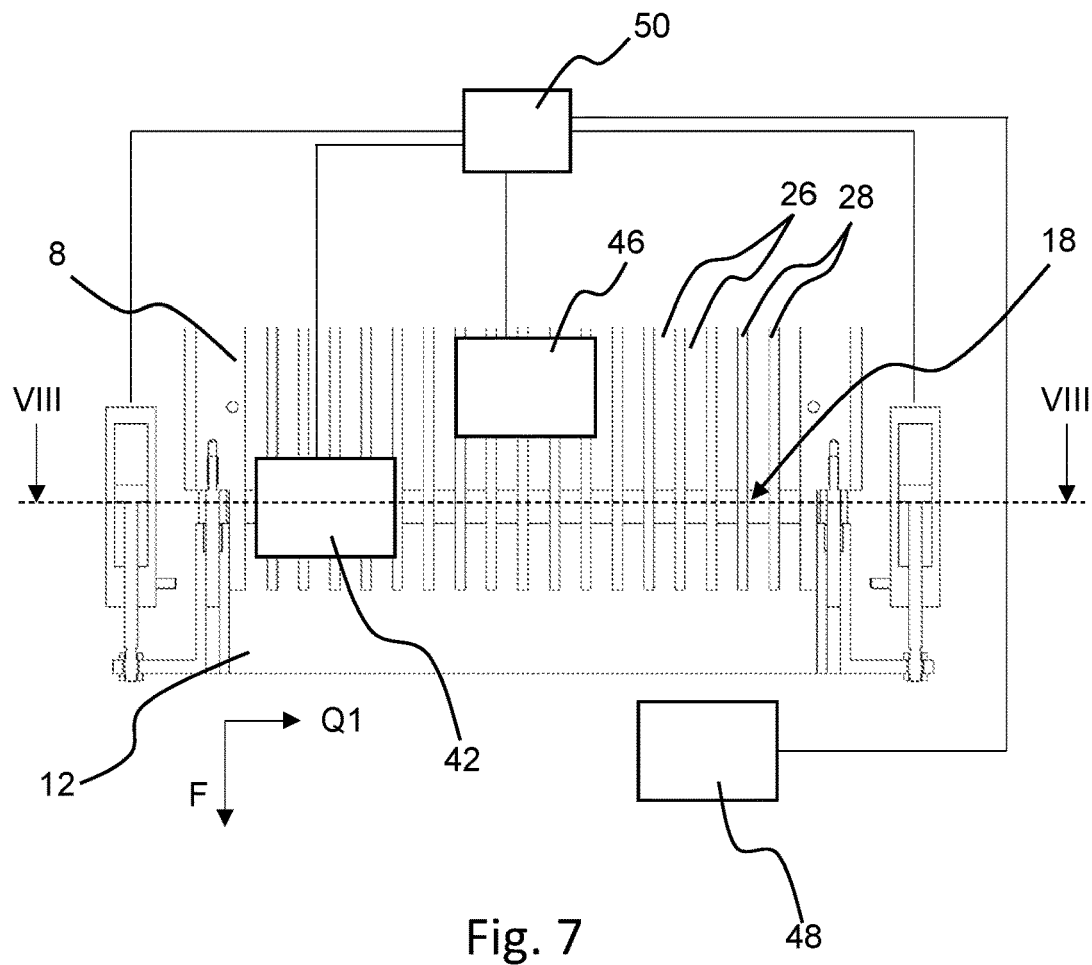
FIG. 7 is a plan view corresponding to FIGS. 6a, b with a schematic illustration of sensors.
Figure 8:
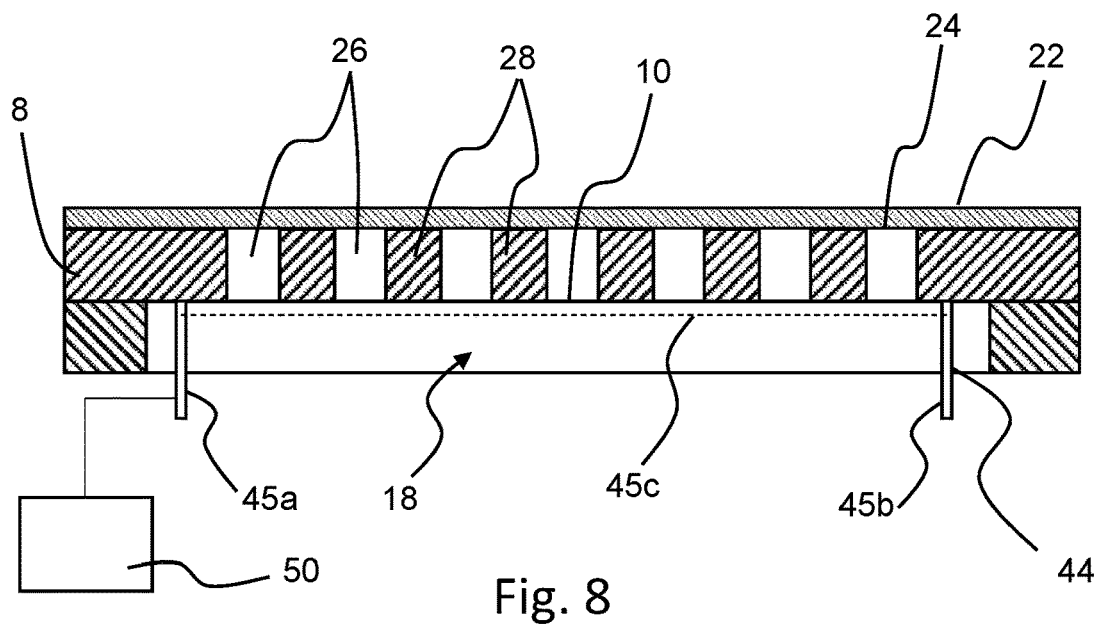
FIG. 8 is a sectional view of the conveying device along the line VIII-VIII in FIG. 7.

FIG. 7 shows a plan view of the conveying device 2 in the region of the gap 18 and FIG. 8 shows a sectional view of the conveying device 2 in the region of the gap 18 along the line VIII-VIII in FIG. 7.

FIG. 7 illustrates a first sensor 42 according to a first embodiment. The first sensor 42 is arranged above the gap 18 and detects bulk material which dwells in the gap 18. The covering element 22 can be designed to be transparent in this case in order to allow the detection of bulk material in the region of the gap 18 by means of the first sensor 42 through the covering element 22. If the first sensor 42 detects only part of the plurality of conveying channels 26 in the region of the gap 18, as illustrated, a plurality of first sensors 42 are preferably arranged next to one another in the first transverse direction Q1 such that all the conveying channels 26 in the region of the gap 18 can be monitored. The first sensor 42 then recognizes a bulk material, in particular one of the products 32, in the region of the gap 18 and detects a time period for which the recognized bulk material is situated in the region of the gap 18. If the detected time period is greater than a predefined limit value, a jam can be assumed. This also is the case if the first sensor 42 recognizes that a product 32 does not move further in the conveying direction F.

FIG. 8 illustrates a second sensor 44 according to a second embodiment. The second sensor is arranged in the gap 18 or just below the gap 18. The second sensor 44 can detect bulk material dwelling in the gap 18 or the passage of bulk material through the gap 18. In the exemplary embodiment illustrated, the second sensor 44 takes the form of a light barrier which comprises a transmitter 45a and a receiver 45b between which a light beam 45c indicated in dashed lines runs. If a product 32 moves beyond the gap 18, it does not interrupt the light beam 45c. If product 36 falls through the gap 18, it interrupts the light beam 45c only briefly. If a product 32 or product breakage 36 tilts into the gap 18 and jams there, the light beam 45c is interrupted for longer or permanently, with the result that a jam is recognized.

A third sensor 46 according to a third embodiment can in turn be seen in FIG. 7. The third sensor 46 is arranged upstream of the gap 18 and ideally upstream of the covering element 22 and detects accumulating bulk material. If a product 32 jams in the region of the gap 18 in one of the conveying channels 26, it blocks following bulk material, with the result that the latter accumulates. The third sensor 46 recognizes such an accumulation, with the result that a jam is recognized. As described in relation to the first sensor 42, the third sensor can detect only part of the plurality of conveying channels 26 or all the conveying channels 26.

Finally, FIG. 7 also illustrates a fourth sensor 48 according to a fourth embodiment. The fourth sensor 48 is arranged downstream of the gap 18 with respect to the conveying direction F and can be assigned, for example, to the processing station 4. The fourth sensor 48 detects a decreasing output of the conveying device 2. If the output of the conveying device 2 drops below a predetermined limit value, a blockage of at least one conveying channel 26 by a jammed product 32 can be assumed, with the result that a jam is recognized.

The conveying device 2 preferably comprises a control device 50 for controlling the at least one actuating drive 21. The control device 50 can also control the drive device 16 of the conveying device 2. The control device 50 is preferably communicatively connected to the at least one sensor, as indicated in FIGS. 7 and 8 by the connection of the first sensor 42, of the second sensor 44, of the third sensor 46 and of the fourth sensor 48 to the control device 50. The at least one sensor 42, 44, 46, 48 provides a signal which is transmitted to the control device 50 which, in response to the signal, controls the at least one actuating drive 21 in such a way that the first and the second conveying element 8, 12 are moved from the first position into the second position. As a result, the jam is released and the first and the second conveying element 8, 12 can be moved back into the first position.

Finally, a blister machine 52 having a conveying device 2 as described above is schematically illustrated in FIG. 9. In the blister machine 52, a web-shaped forming film 54 is preferably provided on a first supply roll 56. The forming film 54 is first of all fed to a forming station 58 which forms blisters for receiving products 32 into the forming film 54. The forming film 54 is then fed to the filling station 4 in which products 32 are filled into the blisters of the forming film 54. For this purpose, the products 32 in the form of bulk material, which also contains product breakage 36, are provided in the product store 6. The product store 6 serves for receiving the bulk material and dispenses the bulk material onto the conveying device 2. The conveying device 2 conveys the bulk material in the conveying direction F, with product breakage 36 being separated, as described above. Only products 32 of predetermined quality are conveyed by the conveying device 2 to the filling station 4.

A web-shaped cover foil 60 is preferably provided on a second supply roll 62 in the blister machine 52. The cover foil 60 is fed to the forming film 54 filled with products 32 and sealed onto the forming film 54 in a sealing station 64 for closing the blisters of the forming film 54. In a punching station 66, individual blister packs are then punched out of the film-foil composite consisting of forming film 54 and cover foil 60.

It will be understood that the conveying device 2 can alternatively also be used in other packaging machines, such as, for example, in bottle lines in which tablets, capsules, chewing gums or the like are filled into bottle-like containers.

The invention claimed is:

1. A conveying device for conveying bulk material, comprising a plurality of products and product breakage thereof, in a conveying direction, wherein the conveying device comprises:

a first conveying element having a first conveying surface on which the bulk material is conveyed in the conveying direction;

a second conveying element having a second conveying surface on which the bulk material is conveyed further in the conveying direction, wherein the second conveying element is arranged downstream of the first conveying element in the conveying direction; and a covering element having a covering surface which is arranged substantially parallel to the first conveying surface and to the second conveying surface and faces the first conveying surface and the second conveying surface to form at least one conveying channel for the bulk material between the first conveying surface, the second conveying surface and the covering surface;

wherein the first conveying element and the second conveying element are arranged spaced apart from one another in the conveying direction such that a gap is formed between the first conveying element and the second conveying element, wherein the covering element is arranged above the gap and above a portion of the first conveying element and a portion of the second conveying element which adjoin the gap;

wherein, in a first position of the first conveying element and the second conveying element, the gap has, in the conveying direction, a first width according to a predefined separating criterion which allows passage of product breakage through the gap, but prevents passage of products through the gap; and wherein the conveying device further comprises a plurality of guide elements which extend over the gap in the conveying direction, are arranged next to one another in a direction transversely to the conveying direction and laterally delimit a plurality of conveying channels for the bulk material transversely to the conveying direction, wherein the covering element upwardly delimits the plurality of conveying channels, and wherein the first conveying surface and the second conveying surface downwardly delimit the plurality of conveying channels in portions of the first and second conveying elements which adjoin the gap.

2. The conveying device of claim 1, wherein the first conveying element and/or the second conveying element are movable relative to one another in the conveying direction and the width of the gap is adjustable.

3. The conveying device of claim 2, wherein the first conveying element and/or the second conveying element are movable between the first position and a second position in the conveying direction, wherein the gap has, in the second position, a second width which is greater than the first width.

4. The conveying device of claim 1, wherein the plurality of guide elements is mounted on the first conveying element and projects beyond the first conveying element in the conveying direction, wherein the plurality of guide elements extend over the gap and at least partially over the second conveying element.

5. The conveying device of claim 1, wherein a distance between two adjacent guide elements of the plurality of guide elements defines a width of the plurality of conveying channels and a distance of the covering surface from the first and the second conveying surfaces defines a height of the plurality of conveying channels, wherein the plurality of conveying channels have a width and a height configured to maintain the products in a predefined orientation with respect to the conveying direction, wherein a first dimension of the products in the predefined orientation is defined parallel to the conveying direction, wherein the separating criterion is defined in dependence on the first dimension.

6. A blister machine having:

a product store for receiving bulk material comprising a plurality of products and product breakage thereof, a conveying device for separating product breakage and conveying the products in a conveying direction, wherein the conveying device comprises:

a first conveying element having a first conveying surface on which the bulk material is conveyed in the conveying direction;

a second conveying element having a second conveying surface on which the bulk material is conveyed further in the conveying direction, wherein the second conveying element is arranged downstream of the first conveying element in the conveying direction; and a covering element having a covering surface which is arranged substantially parallel to the first conveying surface and to the second conveying surface and faces the first conveying surface and the second conveying surface to form at least one conveying channel for the bulk material between the first conveying surface, the second conveying surface and the covering surface;

wherein the first conveying element and the second conveying element are arranged spaced apart from one another in the conveying direction such that a gap is formed between the first conveying element and the second conveying element, wherein the covering element is arranged above the gap and above a portion of the first conveying element and a portion of the second conveying element which adjoin the gap;

wherein, in a first position of the first conveying element and the second conveying element, the gap has, in the conveying direction, a first width according to a predefined separating criterion which allows passage of product breakage through the gap, but prevents passage of products through the gap, and a filling station for filling the products into blisters, wherein the product store is configured to dispense the bulk material to the conveying device and the conveying device is configured to convey the products to the filling station.

7. A method for conveying and sorting bulk material comprising a plurality of products and product breakage thereof, said method carried out in a blister machine, the blister machine having a product store for receiving bulk material comprising a plurality of products and product breakage thereof, a conveying device for separating product breakage and conveying the products in the conveying direction, and a filling station for filling the products into blisters, wherein the product store is configured to dispense the bulk material to the conveying device and the conveying device is configured to convey the products to the filling station, wherein the method comprises the steps of:

conveying the bulk material on a first conveying surface of the conveying device of the blister machine in a conveying direction to a gap which has, in the conveying direction, a first width according to a predefined separating criterion such that product breakage passes through the gap and passage of products through the gap is prevented;

moving the products in the conveying direction beyond the gap onto a second conveying surface of the conveying device of the blister machine and separating product breakage through the gap; and conveying the products on the second conveying surface further in the conveying direction.

8. The method of claim 7, wherein conveying the bulk material to the gap comprises:
orienting the products of the bulk material by way of an orienting device such that the products have a predefined orientation with respect to the conveying direction, wherein a first dimension of the products in the predefined orientation is defined parallel to the conveying direction, wherein the separating criterion is defined in dependence on the first dimension; and
guiding the products of the bulk material to the gap such that the products maintain the predefined orientation;
wherein moving the products beyond the gap comprises guiding the products over the gap such that the products substantially maintain the predefined orientation.

9. The method of claim 7, wherein, before conveying the bulk material to the gap, the method comprises:
setting the first width of the gap according to the predefined separating criterion.

10. The method of claim 7, further comprising:
opening the gap from the first width to a second width which is greater than the first width by way of an actuating drive.

11. The method of claim 10, further comprising:
recognizing a jam of a product or product breakage of the bulk material in the gap by way of at least one sensor;
providing a jam-characterizing signal by means of the at least one sensor when the jam is recognized; and
opening the gap to the second width in response to the jam-characterizing signal to release the jam.

12. The method of claim 11, wherein the step of recognizing a jam of a product or product breakage in the gap comprises:
detecting a time period for which the products or the product breakage of the bulk material are situated in a region of the gap, comparing the detected time period with a predefined limit value, and determining a jam if the detected time period is greater than the predefined limit value; or
detecting bulk material dwelling in the region of the gap or the passage of product breakage through the gap and determining a jam if a bulk material dwelling in the gap or no passage of product breakage is detected; or
detecting the bulk material upstream of the gap, recognizing accumulating bulk material upstream of the gap, and determining a jam if accumulating bulk material is recognized; or
detecting the plurality of products of the bulk material downstream of the gap, recognizing a decreasing output of the products of the bulk material downstream of the gap, and determining a jam if a decreasing output is recognized.

13. A conveying device for conveying bulk material, comprising a plurality of products and product breakage thereof, in a conveying direction, wherein the conveying device comprises:
a conveying element having a first conveying surface on which the bulk material is conveyed in the conveying direction;
a second conveying element having a second conveying surface on which the bulk material is conveyed further in the conveying direction, wherein the second conveying element is arranged downstream of the first conveying element in the conveying direction; and
a covering element having a covering surface which is arranged substantially parallel to the first conveying surface and to the second conveying surface and faces the first conveying surface and the second conveying surface to form at least one conveying channel for the bulk material between the first conveying surface, the second conveying surface and the covering surface;
wherein the first conveying element and the second conveying element are arranged spaced apart from one another in the conveying direction such that a gap is formed between the first conveying element and the second conveying element, wherein the covering element is arranged above the gap and above a portion of the first conveying element and a portion of the second conveying element which adjoin the gap;
wherein, in a first position of the first conveying element and the second conveying element, the gap has, in the conveying direction, a first width according to a predefined separating criterion which allows the passage of product breakage through the gap, but prevents the passage of products through the gap;
wherein the conveying device comprises at least one sensor for recognizing jams of bulk material in the gap.

14. The conveying device of claim 13, wherein the first conveying element and/or the second conveying element are movable relative to one another in the conveying direction and the width of the gap is adjustable.

15. The conveying device of claim 14, wherein the first conveying element and/or the second conveying element are movable between the first position and a second position in the conveying direction, wherein the gap has, in the second position, a second width which is greater than the first width.

16. The conveying device of claim 13, wherein
the at least one sensor is arranged above the gap and is designed to detect bulk material dwelling in the gap, or
the at least one sensor is arranged upstream of the gap with respect to the conveying direction and is designed to detect accumulating bulk material, or
the at least one sensor is arranged downstream of the gap with respect to the conveying direction and is designed to detect a decreasing output of the conveying device.

* * * * *